(12) United States Patent
Wu et al.

(10) Patent No.: US 10,885,617 B2
(45) Date of Patent: Jan. 5, 2021

(54) IMAGE ANALYSIS METHOD AND IMAGE ANALYSIS SYSTEM FOR SERVER

(71) Applicant: Chiun Mai Communication Systems, Inc., New Taipei (TW)

(72) Inventors: Kuang-Hui Wu, New Taipei (TW); Huang-Mu Chen, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 214 days.

(21) Appl. No.: 15/972,207

(22) Filed: May 6, 2018

(65) Prior Publication Data
US 2019/0066282 A1 Feb. 28, 2019

(30) Foreign Application Priority Data
Aug. 31, 2017 (CN) .......................... 2017 1 0770219

(51) Int. Cl.
*G06T 7/00* (2017.01)
*G06K 9/00* (2006.01)
*G06T 7/11* (2017.01)
*H04N 5/247* (2006.01)

(52) U.S. Cl.
CPC ............ *G06T 7/00* (2013.01); *G06K 9/00335* (2013.01); *G06K 9/00771* (2013.01); *G06T 7/11* (2017.01); *G06T 2207/30196* (2013.01); *G06T 2207/30252* (2013.01); *H04N 5/247* (2013.01)

(58) Field of Classification Search
CPC ............ G06T 7/00; G06T 2207/30196; G06T 2207/30252; G06F 16/50; G06F 8/61; H04L 67/32; H04W 4/70; H04N 5/247; H04N 19/51; H04N 5/23296; H04N 21/21805; H04N 21/2187; H04N 21/23418; H04N 21/4524; G06K 9/00335; G06K 9/32; G06K 9/00342
See application file for complete search history.

(56) References Cited

U.S. PATENT DOCUMENTS

2002/0168091 A1* 11/2002 Trajkovic ................. G06K 9/32
 382/107
2005/0073585 A1 4/2005 Ettinger et al.
2012/0020518 A1 1/2012 Taguchi
2012/0046044 A1 2/2012 Jamtgaard et al.
(Continued)

FOREIGN PATENT DOCUMENTS

CN 102334142 A 1/2012

*Primary Examiner* — Jianxun Yang
(74) *Attorney, Agent, or Firm* — ScienBiziP, P.C.

(57) ABSTRACT

An image analysis system includes a plurality of cameras. The cameras are configured for taking images. The image analysis system further includes at least one server. The server includes a first obtaining module, a second obtaining module, a filter module, and a storage module. The first obtaining module is configured for obtaining the moving track of the target object. The second obtaining module is configured for obtaining the images taken by the cameras which the target object has passed according to the moving track. The filter module is configured for extracting images containing the target object from the obtained images according to pre-stored specific image features of the target object. The storage module is configured for storing the extracted images that contain the target object. An image analysis method and a server are also provided.

10 Claims, 3 Drawing Sheets

(56) References Cited

U.S. PATENT DOCUMENTS

2014/0267770 A1\* 9/2014 Gervautz .......... H04N 5/23296
 348/169
2015/0085111 A1\* 3/2015 Lavery ............. H04N 21/21805
 348/143

\* cited by examiner

IMAGE ANALYSIS METHOD AND IMAGE ANALYSIS SYSTEM FOR SERVER

FIELD

The disclosure generally relates to image analysis technology, and particularly to a server, an image analysis method and an image analysis system.

BACKGROUND

Analyzing an action type of a target object needs identification of images taken by cameras and parsing the target object and other objects one by one. The work is time-intensive, and may result in errors due to similar characteristics between the target object and other objects.

BRIEF DESCRIPTION OF THE DRAWINGS

Many aspects of the present disclosure can be better understood with reference to the drawings. The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION

Figure 1:
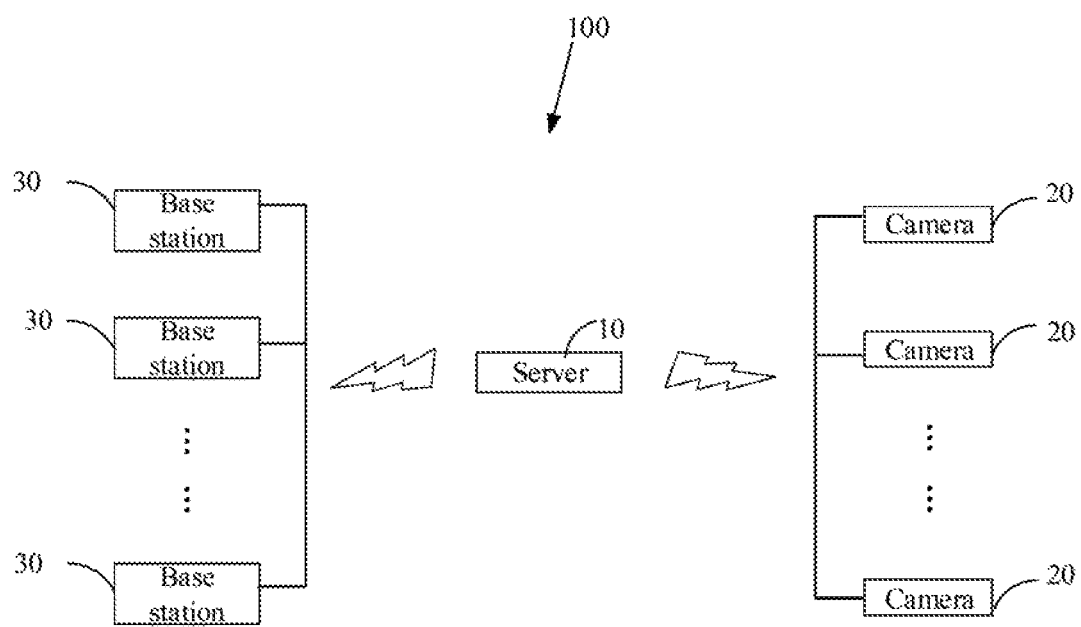
FIG. 1 is a functional block diagram of an exemplary embodiment of an image analysis system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiment described herein can be practiced without these specific details. In other instances, methods, procedures, and components have not been described in detail so as not to obscure the related relevant feature being described. Further, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "compris-ing," when utilized, means "including, but not necessarily limited to"; it specifically indicates open-ended inclusion or membership in the so-described combination, group, series and the like.

FIG. 1 shows an image analysis system 100 in accordance with an exemplary embodiment. The image analysis system 100 includes at least one server 10, a plurality of cameras 20 and a plurality of base stations 30. The at least one server 10 can be a computer host. The cameras 20 are configured to take images, and are connected to the at least one server 10 by cable network or wireless network. In the embodiment, the base stations 30 can be a base station or access point with BLUETOOTH, WIFI, or ZIGBEE functions. The cameras 20 can be set indoors and/or outdoors, for example, set in a hospital, a supermarket, or city road. A camera 20 set indoors is defined as an indoor camera and a camera 20 set outdoors is defined as an outdoor camera. The base stations 30 can be set indoors, for example, set in hospitals, and/or supermarkets.

In another embodiment, the base stations 30 and the cameras 20 may be in the same position. The base stations 30 and the cameras 20 that are in the same position can be combined into one electronic device and so treated. That is, a combined type base station 30 further includes one or a plurality of cameras 20, and a combined type camera 20 further includes one or a plurality of base stations 30.

Figure 2:
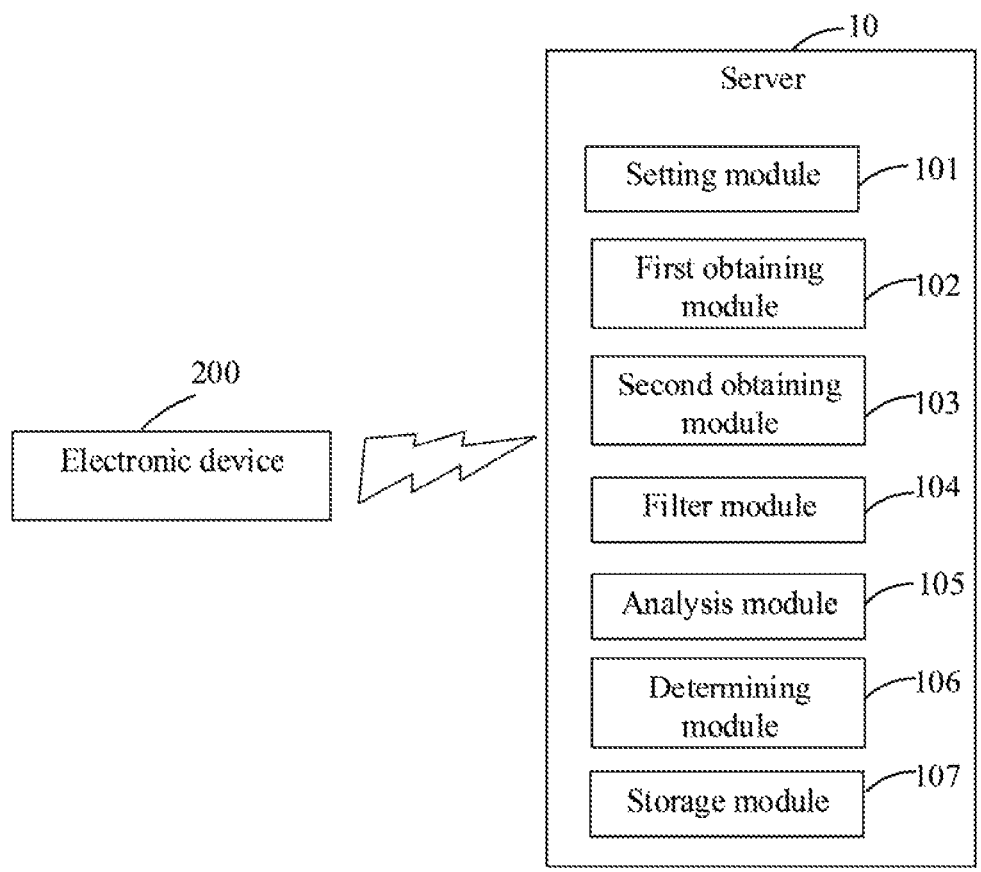
FIG. 2 is a functional block diagram of an exemplary embodiment of a server.

Referring to FIG. 2, the image analysis system 100 includes a setting module 101, a first obtaining module 102, a second obtaining module 103, a filter module 104, an analysis module 105, a determining module 106, and a storage module 107.

In this embodiment, the setting module 101 is configured for setting coordinate information for each of the outdoor cameras 20, the indoor cameras 20 and the base stations 30. The coordinate information includes the X, Y, Z coordinate of the cameras 20 and the base stations 30 in the three axial directions. The coordinate information also can be a location from Global Positioning System (GPS).

In this embodiment, the first obtaining module 102 is configured for obtaining a moving track of a target object. The target object can be a person, a vehicle, or other objects. The moving track can include an indoor track and/or an outdoor track.

The base stations 30 are configured for obtaining an indoor location of the target object, and transmitting the indoor location to the server 10. The first obtaining module 102 receives the indoor location of the target object, and records a time of the receiving of the indoor location. The first obtaining module 102 can obtain the indoor track of the target object according to the indoor location of the target object received from the base stations 30 and a time of the receiving of the indoor location. The target object carries an electronic device 200, and the electronic device 200 transmits wireless signals to communicate with the base station 30. The base station 30 detects the wireless signal from the electronic device 200, and calculates a location of the electronic device 200. In an exemplary embodiment, the base station 30 calculates the location of the electronic device 200 based on an intensity of the received wireless signal and the coordinate information of the base station 30. The indoor location is the X, Y, Z coordinates of the target object in the three axial directions. During the movement of the target object, the X, Y, Z coordinates of the target object change accordingly. That is, the coordinates of the target object received by the base stations 30 are variable with time. The server 10 arranges the indoor locations according to a sequence of the time of the receiving of the indoor locations from the base station 30 to obtain the indoor track of the target object.

In this embodiment, the electronic device 200 can be an electronic device with satellite positioning function such as a mobile phone, a tablet, a wearable electronic device or the like. The satellite positioning function, for example, can be GPS positioning function. The electronic device 200 has an identification code. The base stations 30 and the electronic device 200 can be wirelessly connected by a short-range wireless communication protocol (such as BLUETOOTH, WIFI, or ZIGBEE).

When the base stations 30 are configured for obtaining the indoor location of the target object, the electronic device 200 works as a mobile signal point broadcast device. The base stations 30 receives the wireless signals transmitted by the electronic device 200 and calculate the location of the electronic device 200 based on the received wireless signals. The electronic device 200 includes a wireless signal transmission unit (not shown). The wireless signal transmission unit can transmit a wireless signal at a default frequency. The base station 30 includes a wireless signal receiver, and the wireless signal receiver can receive the wireless signal transmitted by the wireless signal transmission unit of the electronic device 200.

The server 10 can obtain the outdoor track of the target object according to the outdoor location transmitted by the electronic device 200. The outdoor location is represented by the X, Y, Z coordinates of the target object. During the movement of the target object, the X, Y, Z coordinates of the target object change accordingly. That is, the coordinates of the target object received by the base station 30 are variable with time. The electronic device 200 obtains the outdoor location of the target object from a satellite positioning system such as the Global Positioning System (GPS). The electronic device 200 transmits the outdoor location of the target object to the first obtaining module 102 at preset time intervals. The server 10 arranges the outdoor locations according to the sequence of the time of the receiving of the outdoor locations to obtain the outdoor track of the target object.

In this embodiment, the second obtaining module 103 is configured for obtaining the images taken by the cameras 20 which the target object has passed according to the indoor track and/or the outdoor track. The second obtaining module 103 compares the moving track of the target object with the coordinate information for the cameras 20, and obtains the images taken by the cameras whose coordinate information is on the moving track of the target object. The images captured by the cameras 20 are then extracted. The images taken by the one or more cameras 20 can be uploaded to the server 10 in real time and stored in the storage module 107.

In this embodiment, the filter module 104 is configured for extracting images containing the target object from the obtained images according to pre-stored specific image features of the target object. The specific image features can be pre-stored in the server 10. In other embodiment, the specific image features can be input by the user through an input device such as a keyboard, a mouse, a touch screen or a microphone to the server 10. The specific image features also can be received by the server 10 from other electronic devices, such as a mobile phone, computers, or the like. When the target object is a person, the specific image features may include appearance and/or size. When the target object is a vehicle, the specific image features may include color of vehicle and/or license number.

The analysis module 105 is configured for analyzing an action type of the target object according to the extracted images. The images containing the target object can be those extracted from the camera 20. The images so extracted can be set to be updated in real time or set to be updated at preset times. The server 10 can be set to receive images of multiple cameras 20 in real time. The server 10 also can be set to receive images from multiple cameras 20 at preset times, for example, images from the multiple cameras 20 can be received every ninety seconds. The action type can be any action which the target object is executing. When the target object is a person, the action type can be coughing, eating, blood drawing, withdrawing money, and the like. When the target object is a vehicle, the action type can be parking, refueling, and the like.

The determining module 106 is configured for determining whether the action type of the target object needs a notification to be issued, and if so sends the notification. For example, if the target object is an infected patient, when analyzing the infected patient is coughing, the determining module 106 can determine that the action type of the infected patient should be notified. Thereupon, a notification is issued to relevant personnel, such as doctors, or nurses, to deal with. The relevant personnel include, but are not limited to police, doctors, and the like.

The storage module 107 is configured for storing the extracted images that contain the target object, the storage module 107 is further configured for storing information related to the target object. The information related to the target object can include, but is not limited to, an identification code of the target object, the time and location of each appearance of the target object in the extracted images, and the action type of the target object. The receiving time and the location can be the time at and the location in which the target object appears in an image. The receiving time and the location also can be the time and the location at which the target object executes an action type. The receiving time can be a notation contained in the image. The location can be the location of the camera 20 that takes image of the target object. The action type is received from the analysis module 105. The identification code of the target object is associated with the identification code of the electronic device 200.

Figure 3:
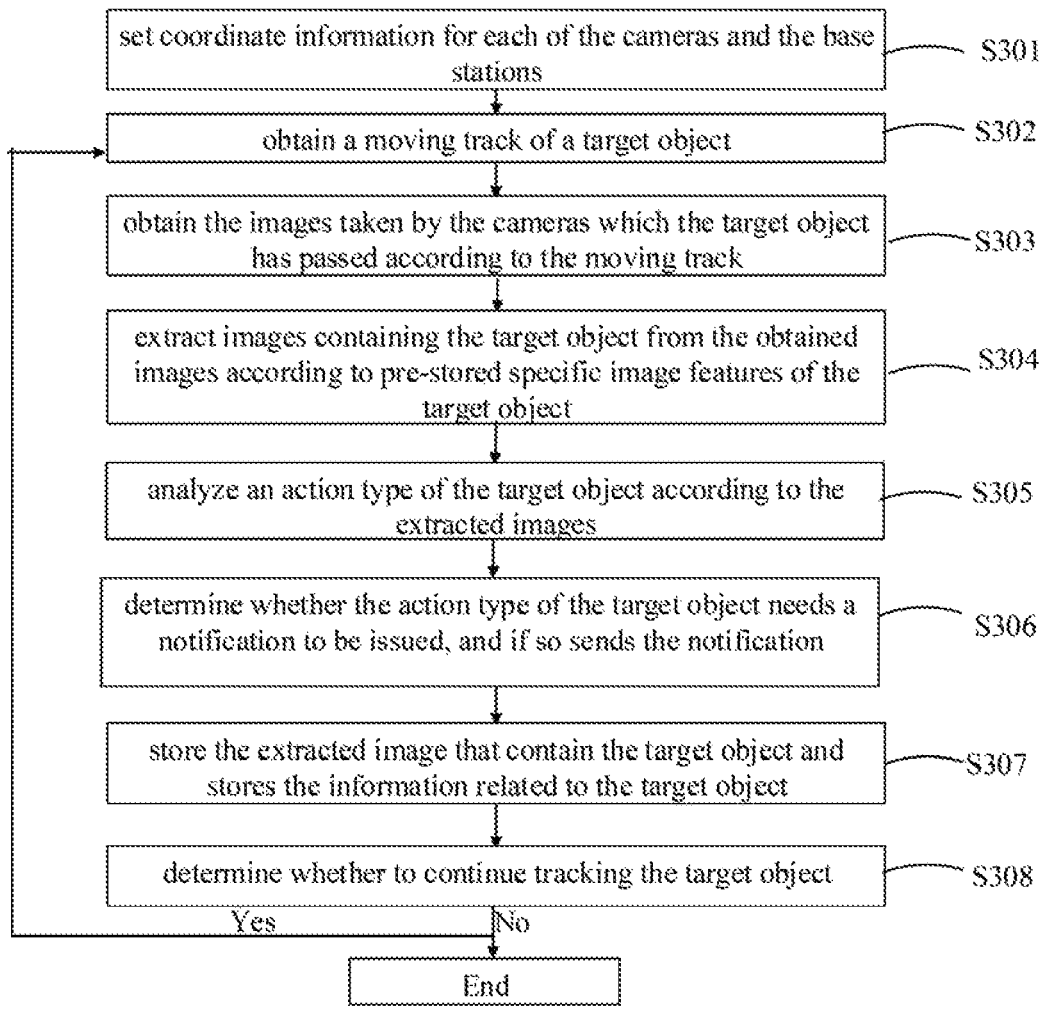
FIG. 3 is a flowchart of an exemplary embodiment of an image analysis method.

Referring to FIG. 3, a flowchart of an exemplary embodiment of image analysis method is presented. The exemplary method is provided by way of example, as there are a variety of ways to carry out the method. The method described below can be carried out using the configurations illustrated in FIG. 2, for example, and various elements of these figures are referenced in explaining example method. Each block shown in FIG. 3 represents one or more processes, methods, or subroutines, carried out in the exemplary method. Additionally, the illustrated order of blocks is by example only and the order of the blocks can be changed. The exemplary method can begin at block 301. Depending on the embodiment, additional steps can be added, others removed, and the ordering of the steps can be changed.

At block S301, the setting module 101 sets a coordinate information for each of the cameras 20 and the base stations 30.

At block S302, the first obtaining module 102 obtains a moving track of a target object. The moving track can be a continuous track formed by coordinate locations of the target object at different times.

At block S303, the second obtaining module 103 obtains the images taken by the cameras 20 which the target object has passed according to the moving track.

At block S304, the filter module 104 extracts images containing the target object from the obtained images according to pre-stored specific image features of the target object. In other words, the filter module 104 extracts the images that match the pre-stored specific image features of the target object from the obtained images taken by the cameras 20 on the moving track.

At block S305, the analysis module 105 analyzes an action type of the target object according to the extracted images.

At block S306, the determining module 106 determines whether the action type of the target object needs a notification to be issued, and if so sends the notification.

At block S307, the storage module 107 stores the extracted images that contain the target object and stores the information related to the target object.

At block S308, the determining module 106 determines whether to continue tracking the target object, and the flow returns to block S302 when it needs to continue the tracking, and the flow ends when it does not need to continue the tracking.

In other embodiment, the block S305 and the block S306 can be omitted to simplify the image analysis method according to the moving track.

It is to be understood, however, that even through numerous characteristics and advantages of the present disclosure have been set forth in the foregoing description, together with details of assembly and function, the disclosure is illustrative only, and changes may be made in details, especially in the matters of shape, size, and arrangement of parts within the principles of the disclosure to the full extent indicated by the broad general meaning of the terms in which the appended claims are expressed.

What is claimed is:

1. An image analysis system, comprising:
   a plurality of cameras comprising indoor cameras and outdoor cameras, configured for taking images;
   at least one server, comprising:
   a setting module, configured for setting coordinate information for each of the indoor cameras and the outdoor cameras;
   a plurality of base stations, configured for obtaining an indoor location of the target object;
   a first obtaining module, configured for:
   obtaining a moving track of a target object, and the moving track comprising an indoor track and an outdoor track;
   obtaining the indoor track of the target object according to the indoor location of the target object received from the base stations and time of the receiving of the indoor location; and
   obtaining the outdoor track of the target object according to the received outdoor location of the target object and time of the receiving of the outdoor location, the outdoor location being obtained from a satellite positioning system;
   a second obtaining module, configured for determining at least one target camera whose coordinate information is on the moving track of the target object by comparing the indoor track of the target object with the coordinate information for the indoor cameras and by comparing the outdoor track of the target object with the coordinate information for the outdoor cameras, and obtaining the images taken by the target camera;
   a filter module, configured for extracting images comprising the target object from the obtained images according to pre-stored specific image features of the target object;
   a storage module, configured for storing the extracted images that comprise the target object; and
   an analysis module, configured for analyzing an action type of the target object according to the extracted images.

2. The image analysis system of claim 1, wherein the server further comprising:
   a determining module, configured for determining whether the action type of the target object needs a notification to be issued, and if so sends the notification.

3. The image analysis system of claim 1, wherein the storage module is further configured for storing information related to the target object, the information related to the target object comprises an identification code of the target object, time and location of each appearance of the target object when the target object executes the action type in the extracted images, and the action type of the target object.

4. An image analysis method, comprising:
   setting coordinate information for a plurality of cameras;
   obtaining a moving track of a target object, and the moving track comprising an indoor track and an outdoor track;
   obtaining the indoor track of the target object according to the indoor location of the target object received from the base stations and time of the receiving of the indoor location;
   obtaining the outdoor track of the target object according to the received outdoor location of the target object and time of the receiving of the outdoor location, the outdoor location is obtained from a satellite positioning system;
   determining at least one target camera whose coordinate information is on the moving track of the target object by comparing indoor track of the target object with the coordinate information for the indoor cameras and by comparing the outdoor track of the target object with the coordinate information for the outdoor cameras, and obtaining the images taken by the target camera;
   extracting images containing the target object from the obtained images according to pre-stored specific image features of the target object;
   storing the extracted images that contain the target object
   analyzing an action type of the target object according to the extracted images.

5. The image analysis method of claim 4, further comprising steps of:
   determining whether the action type of the target object needs a notification to be issued.

6. The image analysis method of claim 5, further comprising steps of:
   sending the notification information when it is determined that the notification is needed to be issued.

7. The image analysis method of claim 5, further comprising steps of:
   storing information related to the target object, the information related to the target object comprises an identification code of the target object, time and location of each appearance of the target object when the target object executes the action type in the extracted images, and the action type of the target object.

8. A server, comprising:
a setting module, configured for setting coordinate information for each of indoor cameras and outdoor cameras;
a first obtaining module, configured for:
obtaining a moving track of a target object, and the moving track comprises an indoor track and an outdoor track;
obtaining the indoor track of the target object according to the indoor location of the target object received from the base stations and a time of the receiving of the indoor location; and
obtaining the outdoor track of the target object according to the received outdoor location of the target object and a time of the receiving of the outdoor location, the outdoor location is obtained from a satellite positioning system;
a second obtaining module, configured for determining at least one target camera whose coordinate information is on the moving track of the target object by comparing the indoor track of the target object with the coordinate information for the indoor cameras and by comparing the outdoor track of the target object with the coordinate information for the outdoor cameras, and obtaining the images taken by the target camera;
a filter module, configured for extracting images containing the target object from the obtained images according to pre-stored specific image features of the target object;
a storage module, configured for storing the extracted images that contain the target object; and
an analysis module, configured for analyzing an action type of the target object according to the extracted images.

9. The server of claim 8, wherein the server further comprising:
a determining module, configured for determining whether the action type of the target object needs a notification to be issued, and if so sends the notification.

10. The server of claim 8, wherein the storage module is further configured for storing information related to the target object, the information related to the target object comprises an identification code of the target object, time and location of each appearance of the target object when the target object executes the action type in the extracted images, and the action type of the target object.

* * * * *